Patented June 23, 1942

2,287,538

UNITED STATES PATENT OFFICE 2,287,538

PROCESS FOR THE PRODUCTION OF DENSELY SINTERED CERAMIC MASSES

Karl Schusterius, Berlin-Dahlem, Germany, assignor to the firm Rosenthal-Isolatoren G. m. b. H., Selb (Bavaria), Germany No Drawing. Application September 22, 1937, Serial No. 165,080. In Germany September 24, 1936

6 Claims. (Cl. 106—46)

When reducing to phosphorus tricalciumphosphate with coke and sand in the electric oven, about 1½ kg. of calciumsilicate slag (phosphorus furnace slag) is obtained for about 1 kg. of phosphorus. These slags are, according to the initial product, for instance of the following composition: 25–45% silicic acid, 40–50% lime and 4–15% alumina and further little quantities of iron oxide, magnesia and sulfide sulfur. These slags are employed for railbeds, road building and the manufacturing of artificial stones, but the greatest portions are run to the waste heaps.

It has been found, that this so-called phosphorus slag is extraordinarily well suited for the production of densely sintered ceramic products. These products show a very well sintered body possessing great mechanical strength. For the objects of the invention the slag is ground and mixed with clay and oxides, for instance corundum, and then burned in the ceramic oven.

By the invention it has become possible, to employ the oxide CaO in a suitable manner. The sintering dolomite (CaO, MgO) or sintering lime calcinated at high temperature has been employed almost exclusively for refractory furnace bricks, furnace linings and masses to be stamped, they are very rich in lime and therefore porous. For the production of dense and homogenous porcelain-like bodies the introduction of sintering lime is not suitable, as this sintering lime in finely-ground state possesses hydraulic properties, whereby the molding of such masses in the ceramic working method is rendered rather difficult. The introduction of calcium carbonate again causes great shrinking and also a very strong impairing of the solidity in the fire owing to the shortening of the burning range. Introduction of fluor-spar in these large quantities is not admissible at all. The inventor has observed, that these inconveniences will not occur if CaO is employed as calcium silicate (phosphorus slag). Phosphorus slag does not possess any hydraulic properties. It acts in ceramic masses exclusively as lean material. The trituration of the slag during the burning takes place slowly, so that for example with clay-slag mixture no dangerous, easily liquid eutectics can form. According to the invention this new rational employment of the phosphorus slag has to take place during the production of densely burnt ceramic moulded pieces, for instance electric insulators.

When employing the slag, two points have to be considered. To the one group belong mixtures from 30 to 60% slag, 60 to 30% clay and about 10 to 20% chamotte. These mixtures are produced without consideration of the crystal formations to be expected, merely according to the requirements of a good moldability and of the production of the dense body.

To the second group belong gobbings which are sorted out in such a manner, that a uniform crystallised combination is formed in the fire. The artificial crystallisation of the anorthite $CaO.Al_2O_3.2SiO_2$ has proved to be very favorable for the structure of the body. To facilitate the hardening, some fluorspar in a quantity of 1% may also be added. Such a gobbing would be, in consideration of the formation of anorthite, for example: 1% fluorspar, 36% phosphorus slag, 9% clay chamotte, 42% plastic clay, 12% corundum.

This gobbing alters with the composition of the phosphorus slag employed.

In order to obtain a lower sintering temperature up to about 5% of soda feldspar may be added which as albite thoroughly crystallises isomorphously with anorthite.

To the same group belongs also a mixture of phosphorus slag with talcum in the proportion of 1:1. This mass can be well treated in the dry-press process and gives in the ceramic oven a dense body, which consists almost entirely of diopside $CaO \cdot MgO \cdot 2SiO_2$, provided that phosphorus-slag has been selected which contains very little alumina.

I claim:

1. A process of manufacturing dense ceramic materials, such as for electrical insulators, comprising the steps of forming a finely divided mixture consisting of about 30% to about 60% of slag obtained from calcium phosphate in the presence of reducing elements and silicate-containing materials, such as sand, in an electric furnace, and a balance substantially consisting of silicate selected from aluminum- and magnesium-silicates, shaping and finally sintering said mixture into a dense body.

2. A process of manufacturing dense ceramic materials, such as for electrical insulators, comprising the steps of forming a finely divided mixture consisting of about 30% to about 60% of slag which substantially consists of about 25% to about 45% silicic acid, about 40% to 50% lime and about 4% to 15% alumina, and a balance substantially consisting of silicate selected from aluminum- and magnesium-silicates, shaping and finally sintering said mixture into a dense body.

3. A process of manufacturing dense ceramic materials, such as for electrical insulators, comprising the steps of forming a finely divided mixture consisting of about 30% to about 60% of slag obtained from calcium-phosphate in the presence of reducing elements and silicate-containing materials in an electric furnace, about 1% to 5% of a substance selected from fluorspar and sodium feldspar, and a balance of silicate selected from aluminum- and magnesium-silicates, shaping and finally sintering said mixture into a dense body.

4. A process of manufacturing dense ceramic materials, such as for electrical insulators, comprising the steps of forming a finely divided mixture consisting of about 30% to about 60% of slag obtained from calcium phosphate in the presence of reducing elements and silicate-containing materials, such as sand, in an electric furnace, about 9% to about 20% clay-chamotte, and about 30% to about 60% clay, shaping and finally sintering said mixture into a dense body.

5. A process of manufacturing dense ceramic materials, such as for electrical insulators, comprising the steps of forming a finely divided mixture consisting of about 30% to about 60% of slag obtained from calcium phosphate in the presence of reducing elements and silicate-containing materials, such as sand, in an electric furnace, and a balance substantially consisting of oxide compound, as exemplified by oxide and silicate, of elements selected from a group consisting of aluminum and magnesium, shaping and finally sintering said mixture into a dense body.

6. A method of producing densely sintered ceramic masses, such as for electrical insulators, comprising the steps of comminuting a slag obtained from calcium-phosphate in the presence of reducing elements and silicate in the electric furnace, admixing about 30% to about 60% of the powder thus obtained with about 4% to 15% comminuted alumina and a balance substantially consisting of silicate selected from aluminum- and magnesium-silicates, and firing the mixture until a densely sintered and substantially crystalline body is obtained.

KARL SCHUSTERIUS.